United States Patent Office 3,575,891
Patented Apr. 20, 1971

3,575,891
STABILIZED POLYIMIDES
John R. Le Blanc, Wilbraham, Edward Lavin, Longmeadow, Albert H. Markhart, Wilbraham, and Irving Serlin, Springfield, Mass., assignors to Monsanto Company, St. Louis, Mo.
No Drawing. Filed Jan. 2, 1968, Ser. No. 694,833
Int. Cl. C08g 51/56, 51/58, 51/60
U.S. Cl. 260—2.5         18 Claims

ABSTRACT OF THE DISCLOSURE

Disclosed herein are resin systems characterized by improved oxidative thermal stability which are obtained by incorporating a beneficiating stabilizing additive into a polymer forming composition comprising (1) aromatic polycarboxylic components containing from three to four carboxylic acid groups per molecule selected from the group consisting of free polycarboxylic acids, esters of polycarboxylic acids and ammonium salts of polycarboxylic acids and (2) a polyamine component having at least two primary amino groups per molecule. The beneficiating stabilizing additives used in the practice of the present invention include boric acid, phosphoric acid, sulfuric acid and their acid derivatives and esters and ammonium salts of the foregoing acids.

BACKGROUND OF THE INVENTION (1) Field of the invention

This invention relates to polymeric compositions having improved oxidative thermal stability which compositions exhibit good physical properties even after prolonged exposures to high temperatures such as 700° F. More particularly, it relates to polymeric compositions with improved oxidative thermal stability wherein the polymeric compositions are the polymeric reaction products of (1) aromatic polycarboxylic components containing from three to four carboxylic acid groups per molecule selected from the group consisting of free polycarboxylic acids, esters of polycarboxylic acids and ammonium salts of polycarboxylic acids; and (2) a polyamine component having at least two primary amino groups per molecule. The beneficiating stabilizing additives which are incorporated into the aforementioned polymer forming reactants in order to improve the oxidative thermal stability of the resulting polymer include boric acid, phosphoric acid, sulfuric acid and their acid derivatives and esters and ammonium salts of the foregoing acids.

(2) Description of the prior art

Polymers formed from (1) polycarboxylic acids containing three to four carboxylic acid groups per molecule and derivatives thereof such as the esters and ammonium salt derivatives and (2) a polyamine component containing at least two primary amino groups per molecule are generally well known in the art. These polymer forming systems and resulting polymers are described in detail in U.S. Pat. 3,347,808 and other patents. The polymeric products described in these patents are generally characterized by having excellent thermal stability when exposed to high temperatures for prolonged periods of time. However, the increasing demands of modern technology is requiring even greater performance and improved physical properties in polymeric materials than ever before. Consequently, new applications and end uses utilizing high temperature resistant polymeric materials are requiring even greater oxidative thermal stability and retention of physical properties after prolonged exposure to high temperatures than was heretofore thought possible. In order to obtain improved thermal stability in the polymeric compositions prepared from polycarboxylic components and polyamine components the art advanced through several stages. The first stage involved using aromatic polycarboxylic components and aromatic diamine components in order to minimize the presence of aliphatic substituents which tend to have less thermal stability than their aromatic counterparts. The next step involved replacing the nuclear aromatic hydrogens with more thermally stable halogens and using more thermally stable bridging radicals such as silyl, oxygen, sulfonyl, etc., between aromatic nuclei in polyaromatic reactants in place of alkylene radicals. The patentees in U.S. Pat. 3,347,808 contributed significantly to the art by their discovery that a carbonyl bridging unit between aromatic nuclei in a polyaromatic reactant is capable of undergoing further reaction with a primary amine group to provide crosslinked structures with improved thermal stability and other physical properties. However, not withstanding the foregoing improvements to the thermal stability of the polymeric compositions in question, modern technology still faced the problem of improving their thermal stability and prolonging their useful life upon exposure to high temperatures.

From the foregoing it will be noted that the steps taken to improve the physical properties of the unique polymeric compositions in question involved methods not generally suitable to other polymeric materials because of the inherent nature of the respective polymers. Conversely, methods used to improve oxidative thermal stability of other polymers e.g. polyvinyl chloride, polystyrene, polyethylene, such as the use of flame retardants, nonflamable plasticizers, anti-oxidants were not deemed suitable to the polymeric compositions of the present invention.

In the first place, these ingredients are usually postadded to or dispersed throughout the formed polymer systems. The polymeric compositions of the present invention are for the most part formed in situ and their relatively insoluble, infusible characteristics do not readily permit the post-additon of addtives. Moreover, it was believed that such additives could not be incorporated in with the monomeric polymer forming reactants because of possible adverse interference with the polymer forming reaction, which would inhibit or side track the polymerization reaction. Secondly, additives conventional to the other polymer arts would most likely break down long before the polymeric component of the present invention, thereby contributing to the thermal instability of the sysem.

A definite need existed in the art for polymeric compositions which exhibited even greater thermal stability and prolonged useful life during exposures at high temperatures than those compositions which were heretofore available. These compositions with improved properties were needed in order to fill the materials gap in man's ever broadening technology.

SUMMARY OF THE INVENTION

An object of this invention is to provide polymeric compositions with improved thermal stability and prolonged useful life during exposure to high temperatures.

Another object of this invention is to provide a process for improving the thermal stability of polymeric compositions and prolonging their useful life during exposure to high temperatures.

The present invention is directed to improving the thermal stability of polymeric compositions prepared from (1) aromatic polycarboxylic components containing from three to four carboxylic groups per molecule selected from the group consisting of free polycarboxylic acids, esters of the polycarboxylic acids and ammonium salts of the polycarboxylic acids and (2) polyamine components containing at least two primary amino groups per molecule. The improved thermal stability in these polymeric compositions which is unexpected obtained in the practice of this invention is achieved by incorporating a compound selected from the group consisting of boric acid, phosphoric acid, sulfuric acid, acid derivatives of these acids and the ester and ammonium salt derivatives of the foregoing acids into the polymer forming composition prior to the final curing of the system.

The present invention solves a problem long standing in the art by providing polymeric compositions prepared from (1) an aromatic polycarboxylic component containing from three to four carboxylic groups per molecule which is selected from the group consisting of polycarboxylic acids, esters of polycarboxylic acids and ammonium salts of polycarboxylic acids and (2) a polyamine component containing at least two primary amino groups per molecule which compositions exhibit improved oxidative thermal stability and prolonged useful life during exposures at high temperatures.

DESCRIPTION OF THE PREFERRED EMBODIMENTS

The polymer forming components and the polymeric compositions of the present invention are well known to those skilled in the art. In general the polymeric compositions are the polymerization product of (1) an aromatic polycarboxylic component containing from three to four carboxylic groups per molecule selected from the group consisting of free polycarboxylic acids, esters of polycarboxylic acids, and ammonium salts of polycarboxylic acids; and (2) a polyamine component having at least two primary amino groups per molecule. The suitable derivatives of the free polycarboxylic acids include partial and full ester derivatives wherein the alcohol moiety of the ester is an aliphatic alcohol, aromatic alcohol, an amino alcohol, a polyol such as glycol and other related compounds; and partial and full ammonium salts and substituted ammonium salts of the polycarboxylic acid component wherein the ammonium salt is prepared using ammonia or substituted ammonia such as primary, secondary and tertiary amines.

The free tetracarboxylic acids and their ester derivatives which are used in the present invention are represented by the following formula:

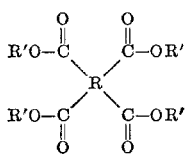

(I)

wherein R is a tetravalent organic radical selected from the group consisting of aromatic carboxylic, aromatic heterocyclic, combination of aromatic carboxylic and aliphatic, combinations of aromatic heterocyclic and aliphatic, and substituted groups thereof. However, the preferred tetravalent radicals are aromatic radicals in which the R groups have at least one ring of 6 carbon atoms characterized by benzenoid unsaturation (alternate double bonds in a ring structure), and particularly those aromatic tetravalent radicals wherein the four carboxylic groups are each attached to separate carbon atoms in a benzene ring and wherein the carbon atoms of each pair of carboxylic groups is directly attached to adjacent carbon atoms in a benzene ring of the R group, and wherein R′ is hydrogen, alkyl radical of from 1 to 12 carbon atoms, oxyalkyl radicals of from 2 to 10 carbon atoms, hydroxyalkyls and hydroxy(oxy)alkyls, wherein the alkyl radicals contain from 2 to 10 carbon atoms; aryl radicals of from 6 to 16 carbon atoms; and N,N-dialkyl alkyl radicals of the following general formula:

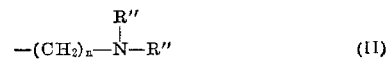

wherein R″ is an alkyl radical of from 1 to 5 carbon atoms and $n$ is an integer of from 2 to 6.

Illustrations of tetracarboxylic acid suitable for use in the present invention include:

2,2′-3,3′-benzophenone tetracarboxylic acid;
3,4,3′,4′-benzophenone tetracarboxylic acid, pyromellitic acid;
2,3,6,7-naphthalene tetracarboxylic acid;
3,3′-4,4′-diphenyl tetracarboxylic acid;
1,2,5,6-naphthalene tetracarboxylic acid;
2,2′,3,3′-diphenyl tetracarboxylic acid;
2,2-bis(3,4-dicarboxyphenyl)propane acid;
bis(3,4-dicarboxyphenyl)sulfone acid;
3,4,9,10-perylene tetracarboxylic acid;
bis(3,4-dicarboxyphenyl)ether acid;
ethylene tetracarboxylic acid;
naphthalene-1,2,4,5-tetracarboxylic acid;
naphthalene-1,4,5,8-tetracarboxylic acid;
decahydronaphthalene-1,4,5,8-tetracarboxylic acid;
4,8-dimethyl-1,2,3,5,6,7-hexahydronaphthalene-1,2,5,6-tetracarboxylic acid;
2,6-dichloronaphthalene-1,4,5,8-tetracarboxylic acid;
2,7-dichloronaphthalene-1,4,5,8-tetracarboxylic acid;
2,3,6,7-tetrachloronaphthalene-1,4,5,8-tetracarboxylic acid;
phenanthrene-1,8,9,10-tetracarboxylic acid;
cyclopentane-1,2,3,4-tetracarboxylic acid;
pyrrolidine-2,3,4,5-tetracarboxylic acid;
pyrazine-2,3,5,6-tetracarboxylic acid;
2,2-bis-(2,3-dicarboxyphenyl)propane acid;
1,1-bis(2,3-dicarboxyphenyl)ethane acid;
1,1-bis(3,4-dicarboxyphenyl)ethane acid;
bis(2,3-dicarboxyphenyl)methane acid;
bis(3,4-dicarboxyphenyl)methane acid;
bis(3,4-dicarboxyphenyl)sulfone acid;
benzene-1,2,3,4-tetracarboxylic acid;
1,2,3,4-butane tetracarboxylic acid;
thiophene-2,3,4,5-tetracarboxylic acid, etc.

Other suitable tetracarboxylic acids may be prepared by linking two mols of trimellitic dianhydride through their free acid group are described in detail in U.S. Pat. 3,182,073 and 3,347,808 and then converting the dianhydride group to the free acid or its ester derivatives through conventional methods. The free acids can then be used to prepare the ammonium salt derivatives using conventional methods.

The free tricarboxylic acids and their ester derivatives which are used in the present invention are represented by the following formula:

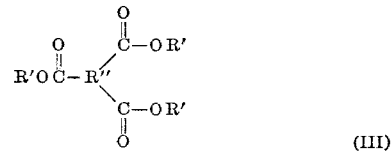

(III)

wherein R″ is a trivalent aromatic radical of from 6 to 18 carbon atoms containing at least one pair of the carboxyl groups in a 1,2-position or a 1,3-position which permits the formation of a cyclic ring structure. The preferred R′″ groups have at least one ring of 6 carbon atoms characterized by benzenoid unsaturation i.e., alternate double bonds in a ring structure. R′ is as defined in Formula I above.

Examples of these tricarboxylic compounds include trimellitic acid, 1,3,8-tricarboxynaphthalene, benzophenone tricarboxylic acids such as benzophenone - 3,3',4' - tricarboxylic acid, benzophenone-4,3',4' - tricarboxylic acid, etc. R'" also includes the trivalent radicals of benzene, naphtahlene, biphenyl, diphenyl ether, diphenyl sulfide, diphenyl sulfone, etc. Preferred tricarboxylic compounds are the isomers of trimellitic acid and benzophenone tricarboxylic acid.

The free polycarboxylic acids used may be prepared by reacting the corresponding dianhydrides in the case of tetracarboxylic compounds or monoanhydride in the case of tricarboxylic compounds with water or other methods well known to those skilled in the art. In a similar fashion the preparation of the ammonium salt derivatives of the polycarboxylic acids is well known to those skilled in the art.

The ester derivatives of the foregoing polycarboxylic acids are readily prepared by reacting the corresponding dianhydride or monoanhydride with an alcohol such as ethanol. By controlling the reaction conditions one may prepare partial or full ester derivatives of the type described above in reference to Formulae I and III. Examples of other suitable alcohols in addition to ethanol mentioned above include methanol, propanol, butanol, pentanol, hexanol, heptanol, octanol, ethylene glycol, diethylene glycol, tri-ethylene glycol, 1,3-propane diol, 1,2-propane diol; 2 - (dimethylamino)ethanol, 3 - (dimethylamino)propanol; 3-(N-ethyl-N-methyl amino)propanol, etc.

The tetracarboxylic acid and tricarboxylic acid esters used in the practice of this invention are available commercially or can be readily prepared by one skilled in the art according to the procedures set forth in U.S. Pat. 3,347,808 or standard reference texts such as Heilbron and Bunbry, "Dictionary of Organic Compounds," Eyre and Spottiswood, London (1953), as well as other references which are well known to those skilled in the art.

The salt derivatives of the polycarboxylic acids, which are reacted with the polyamine components to produce the polymeric compositions used in the present invention, are prepared by reacting a polycarboxylic acid of the type represented by Formulae I and/or III above wherein R' is hydrogen, with ammonia and its substituted derivatives.

The substituted derivatives of ammonia used in the present invention include those of the following general formula:

(IV)

which are prepared by replacing the hydrogen atoms on the ammonia molecule with radicals selected from the group consisting of alkyl, aryl or cycloalkyl.

$R_x$, $R_y$ and $R_z$ in the foregoing Formula IV are selected from the group consisting of hydrogen, alkyl radicals of from 1 to 8 carbon atoms, cycloalkyl radicals of from 5 to 8 carbon atoms and aryl radicals of from 6 to 16 carbon atoms.

In the preferred substituted ammonia derivatives $R_x$, $R_y$ and $R_z$ are alkyl of from 2 to 8 carbon atoms, cycloalkyl of from 5 to 8 carbon atoms, and aryl of from 6 to 10 carbon atoms.

Examples of compounds that are reacted with the polycarboxylic acid components to form the polycarboxylic acid substituted ammonium salt derivatives which are used in the practice of this invention include ammonia and its substituted derivatives. These derivatives of ammonia include monomethylamine, diethylamine, trimethylamine, triethylamine, tripropylamine, tri-n-butylamine, tri-isopentylamine, tripentylamine, tri-n-hexylamine, tri-n-heptyl amine, N methyl diethylamine, N,N-dimethylbenzylamine, N-ethyldibenzylamine, triphenyl amine, dimethylaniline, diethylaniline, triethylene diamine, etc. Other compounds which may be used to form salts with the polycarboxylic compounds include pyridine type compounds such as halo-pyridines such as 2-chloropyridine, etc.; alkyl substituted pyridines wherein the alkyl groups contain from 1 to 4 carbon atoms such as methyl pyridines, 2,4,6-trimethyl pyridine, 2-ethyl pyridine, 4-ethyl pyridine, pyridines such as pyridine-1-oxide, pyridine-1-sulfide and their alkyl derivatives wherein the alkyl groups contain from 1 to 4 carbon atoms; aromatic pyridines such as 2,2'-bipyridine, 4-benzylpyridine, etc.; other heterocyclic nitrogen compounds would include quinoline, pyrimidine and its alkyl derivatives wherein the alkyl group contains from 1 to 4 carbon atoms; pyrazine, 2-methyl pyrazine, 2-ethyl pyrazine, etc. Also suitable are quinolidines, acridines, isoquinolines, quinoxalines, pyridiazines, S-triazine and other triazines, cinnolines, quinazolines and their alkyl derivatives wherein the alkyl group contains from 1 to 4 carbon atoms, tetramethylguanidine, etc. Also contemplated is the use of alkanol amines such as 3-diethylamino-1-propanol, etc. The preferred substituted ammonia derivatives are the tertiary amines.

The expression "ammonium salts" is used herein to include those salts prepared using the derivatives of ammonia set forth above, and the pyridine derivatives.

The preferred tetracarboxylic components are the ester derivatives with the dialkyl and dihydroxyalkyl derivatives being especially preferred. The preferred tricarboxylic components are the free trimellitic and benzophenone acids and their partial and full ester derivatives. In the especially preferred embodiment the alkyl group of the ester contains from 1 to 4 carbon atoms.

The polyamines used in the practice of the present invention include diamines characterized by the formula: $H_2N—R_1—NH_2$ wherein $R_1$ is a divalent radical containing at least two carbon atoms selected from the following groups: aromatic, aliphatic, cycloaliphatic, combination of aromatic and aliphatic, heterocyclic and bridged aromatic radicals wherein the bridging group is a divalent radical selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silicon and derivatives thereof. The preferred $R_1$ groups in the diamines are the aromatic amines containing at least one ring of 6 carbon atoms, characterized by benzenoid unsaturation. Such $R_1$ groups include paraphenylene, meta-phenylene, bisphenyl radicals, fused ring systems having 2 to 4 aromatic nuclei wherein the two amine groups would be located on separate aromatic nuclei and bridged organic radicals of the general formula:

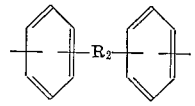

wherein $R_2$ is a divalent radical selected from the group consisting of an alklene radical of from 1 to 6 carbon atoms, arylene radicals of from 6 to 16 carbon atoms, oxygen, —NH—, carbonyl, sulfonyl, phosphonyl and silyl radicals wherein the substituent groups are aryl on the silyl and those structures wherein the $R_2$ group is a divalent linking moiety joining the aromatic nuclei by ester, amide and thioester linkages.

Among the diamines which are suitable for use in the present invention are:

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)diphenyl silane;

bis-(4-amino-phenyl)-N-methyl amine;
1,5-diamino napthalene;
3,3'-dimethyl-4-4'-diamino-diphenyl;
3,3'-dimethoxy benzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)-methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amina-propoxy)ethane;
2,2-dimethyl propylene diamine;
3-methoxy-hexamethylene diamine;
2,5-dimethyl-hexamethylene diamine;
2,5-dimethyl-heptamethylene diamine;
5-methylnonamethylene diamine;
1,4-diamino-cyclohexane;
1,12-diamino-octadecane;
2,5-diamino-1,3,4-oxadiazole;
$H_2N(CH_2)_2O(CH_2)_3NH_2$;
$H_2N(CH_2)_3S(CH_2)_3NH_2$;
$H_2N(CH_2)_3U(CH_3)(CH_2)_3NH_2$;
3,3'-dichlorobenzidine;
bis-(4-amino-phenyl)ethyl phosphine oxide;
bis-(4-amino-phenyl)-phenyl phosphine oxide;
bis-(4-amino-phenyl)N-phenylamine;
p-phenylene-bis-2(amino-1,3-benzoxazole);
2,5-bis(p-amino phenyl)-1,3,4-oxadiazole;
m-phenylene-bis-(m-aminobenzamide);
3,4'-di-amino benzanilide and mixture of the foregoing.

Other polyamines which contain from 3 to 6 amine groups per molecule may also be used. Examples of such suitable polyamines include melamine; tris-(4-aminophenyl)methylcarbinol - 3 - methyl - 4,6,4' - triamino-diphenylmethane; 1,2,4-benzenetriamine; 1,3,5-triaminobenzene; 2,4,4'-bis-phenyltriamine; the various triaminodiphenyl ethers; tetraamino-diphenyl ethers; hexaminodiphenyl ethers; etc., the various triaminodiphenyl sulfides; tetraaminodiphenyl sulfides; pentaaminodiphenyl sulfides, etc., 3,3'-diamino-benzidine; bis(3-methyl - 4,6 - diaminophenyl)-methane; and various tri, tetra, penta and hexaminodiphenyl compounds wherein the two phenyl groups are bridged by an alkylene of from 1 to 6 carbon atoms, arylene of from 6 to 16 carbon atoms, oxygen, —NH—, carbonyl, sulfur, sulfonyl, phosphorous, phosphonyl and silyl radicals.

The preferred polyamines for use in this invention are the diamines, melamine and mixtures thereof. Especially preferred are the diamines set forth above wherein $R_1$ is an aromatic group containing at least one ring of 6 carbon atoms characterized by benzoid unsaturation.

The proportion of reactants used can be varied over a wide range, for example one can use about 70% molar excess of the polyamine to about a 10% molar excess of the polycarboxylic compound. Preferably one would use up to a 20% molar excess of the polyamine to about a 5% molar excess of the polycarboxylic compound. More preferably, one would use equimolar amounts of the respective components.

Useful solvents with which to prepare the monomeric solutions disclosed above include organic liquids such as the lower alkyl alcohols of from 1 to 6 carbon atoms; polyols such as glycol, ethylene gycol, acetone, methy ethyl ketone, dioxane, cresol, toluol, N-substituted pyrrolidone such as N-methylpyrrolidone, N-cyclohexylpyrrolidone, N-butylpyrrolidone, dimethylacetamide, acetanilide, dimethylformamide, high boiling petroleum hydrocarbons and mixtures thereof. Mixture of water with certain organic liquids such as acetone and ethyl alcohol may be used where the solubility of the particular monomers permit.

The solids content of the solutions may vary over a wide range. Preferably one would use a solution with a solids content of at least 3%. Most coating applications are more economically carried out with solutions containing at least 15% solids. In the case of electrical varnishes, solids contents of at least 20% have been found most satisfactory. The concentration used is determined by the particular requirements of the end use application as is well known to those skilled in the art.

The thermal stabilizer component used in the present invention is an acid based on boron, phosphorous or sulfur, ester derivatives of these foregoing acids, ammonium salts of the foregoing acids including salts formed from the substituted derivatives of ammonia such as the secondary and tertiary amines. The most commonly known boron, phosphorous and sulfur containing acids are boric acid, phosphoric acid and sulfuric acid, respectively. There are various well known other boron, phosphorous and sulfur containing acids which will be considered as acid derivatives of boric, phosphoric and sulfuric acid for purposes of the present invention.

Examples of the acid derivatives of the aforementioned boric, phosphoric and sulfuric acids include orthoboric acid, pyroboric acid, boronic acid, borinic acid, polyphosphoric acid, hypophosphoric acid, orthophosphoric acid, mono- and di-alkyl hypophosphoric acid wherein the alkyl group contains from 1 to 10 carbon atoms, mono- and di-aryl hypophosphoric acid wherein the aryl group contains from 6 to 10 carbon atoms, sulfurous acid, sulfonic acid, aryl sulfonic acids such as para-toluene sulfonic acid, benzene disulfonic acid, etc.

These acid derivatives of boric, phosphoric and sulfuric acid are also used to form ester derivatives and salt derivatives prepared from ammonia and substituted ammonia derivatives, which are used as thermal stabilizers as is outlined below.

Examples of the ester derivatives of the aforementioned boric, phosphoric and sulfuric acids include alkyl borates, alkyl phosphates, alkyl sulfates, alkyl acid borates, alkyl acid phosphates, alkyl acid sulfates; wherein the akyl group is selected from the group consisting of alkyl and oxyalkyl radicals of from 1 to 12 carbon atoms; aryl borates, aryl phosphates and aryl sulfates; wherein the aryl group contains from 6 to 10 carbon atoms; and mixed alkyl aryl borates, sulfates and phosphates; alkaryl borates, alkaryl phosphates and alkaryl sulfates wherein the aryl group contains from 6 to 16 carbon atoms and wherein the alkyl side chain contains from 1 to 6 carbon atoms.

Further examples of these esters include methyl acid phosphate, ethyl acid phosphate, butyl acid phosphate, triethyl phosphate, tributyl phosphate, ethyl phosphate, propyl phosphate, triphenyl phosphate, amyl phosphate, cresyl diphenyl phosphate, tricresyl phosphate, methyl diethyl hypophosphate, monomethyl orthophosphate, diethyl orthophosphate, dimethyl methyl phosphate, N-methylol phosphonate, ethylhexyl diphenyl phosphate, trioctyl phosphate, and their corresponding thiophosphate analogues; trimethyl borate, triethyl borate, ethyl acid borate, phenyl acid sulfate, methyl hydrogen sulfate, dimethyl sulfate, methyl chlorosulfamate, methyl chlorosulfonate, ethylene sulfate, glyoxal sulfate, ethyl hydrogen sulfate, n-butyl hydrogen sulfate, etc.

Especially preferred are alkyl borates, alkyl phosphates and alkyl sulfates containing at least one alkyl group per molecule wherein the alkyl group contains from 1 to 12 carbon atoms.

The salt derivatives of boric acid, phosphoric acid and sulfuric acid which are used in the present invention are the ammonium salts and derivatives of ammonia. The derivatives of ammonia include primary, secondary, tertiary amines and heterocyclic amines of the type mentioned above in regard to the tetracarboxylic salt polymer forming component. Specific examples of these stabilizing salts include ammonium borates, ammonium phosphates, ammonium sulfates, tertiary amine borates, tertiary amine phosphates and tertiary amine sulfates, etc.

The amount of thermal stabilizer used is determined by the particular additive used and the desired degree of improvement in thermal stability. In general, at least 0.1% and more preferably 0.5% by weight based on the weight of the monomeric components of the varnish is used to impart improved thermal stability to the cured polymeric compositions.

The upper limit on the amount of thermal stabilizer used is selected so as to provide maximum thermal stability without adversely affecting other polymer properties. As a practical upper limit one would use up to 50% by weight based on the weight of the monomeric components of a thermal stabilizer additive. Beyond this amount no significant improvement in thermal stability is observed by a further increase in the amount of additive used.

Stated in another way, one would use between 0.1% by weight and 50% by weight of the thermal stabilizer additive. More preferably, one would use between 0.5% by weight and 20% by weight of the thermal stabilizer additive based on the weight of the monomeric components of the varnish. In view of the teachings set forth herein one skilled in the art will be readily able to select the amount of stabilizer component which will provide maximum thermal stability without adversely affecting other polymeric properties.

The following examples are set forth in illustration of this invention and should not be construed as limitations thereof. All parts and percentages given are by weight unless otherwise indicated.

The thermal stability of the polymeric compositions of the present invention is determined by incorporating the various additives into the monomeric varnishes and then impregnating 2" x 4" strips of glass or asbestos cloth of known weight with these formulated monomeric varnishes. The impregnated fibrous reinforcing medium, which is referred to as a coupon, is allowed to air dry at room temperature, then it is cured according to the following schedule:

2 hours at 120° C.
1 hour at 180° C.
16 hours at 280° C.
4 hours at 372° C.

After this curing schedule the resin starting weight of the coupon sample is obtained and then the coupons are aged at 700° F. for varying amounts of time. After each interval of high temperature aging the percent weight loss of the coupon is calculated using conventional methods.

Alternatively, in some examples the above procedures are followed in regard to preparing the coupons and the time required for 50% resin weight loss at 700° F. is determined.

EXAMPLE I (CONTROL)

This example is set forth as a control to illustrate the preparation of a typical varnish used for coatings and impregnating substrates.

An impregnating varnish of the type described in U.S. Pat. 3,347,808 is prepared by dissolving equimolar quantities of benzophenonetetracarboxylic acid diethyl ester (414 parts) and m-phenylene diamine (108 parts) in a solvent which is a 4/1 by volume mixture of N-methyl pyrrolidone/ethanol. The solids content of the resulting solution is about 62.5%.

EXAMPLES 2 TO 11

In the following examples the varnish solution prepared in Example 1 is stabilized with various additives and then used to impregnate 181E–A1100 glass cloth. The cured coupon is then tested for heat stability by measuring weight loss of the polymeric reaction product on glass cloth. The glass cloth coupons are prepared and tested according to the procedures described above. The results of these weight loss studies are tabulated in the following Table I.

In each example the stabilizer is added to the varnish solution prepared in Example I prior to impregnating the glass cloth. The amount of stabilizer used is given in percent by weight based on the weight of the solids content of the varnish solution.

TABLE I.—WEIGHT LOSS STUDY—EXAMPLE 1 POLYMER/GLASS CLOTH COUPONS

| Example | Stabilizer | Amount percent | Time (hrs.) at 700° F. in air | | | |
|---|---|---|---|---|---|---|
| | | | 110 | 158 | 250 | 315 |
| 1 (Control) | None | | 21.7 | 39.9 | 62.4 | 78.5 |
| 2 | Butyl acid phosphate | 1 | 7.7 | 16.7 | 33.1 | 55.2 |
| 3 | do | 2.5 | 6.7 | 9.1 | 19.1 | 26.6 |
| 4 | do | 5 | 6.3 | 8.2 | 14.5 | 18.5 |
| 5 | do | 10 | 9.3 | 13.5 | 17.7 | 22.7 |
| 6 | do | 20 | 12.6 | 15.5 | 21.4 | 24.1 |
| 7 | Ethylacid phosphate | 7 | 5.9 | 8.9 | 12.0 | 16.8 |
| 8 | Monoammonium phosphate | 5 | 8.7 | 12.5 | 23.7 | 37.1 |
| 9 | Sulfuric acid (98%) | 0.5 | 13.5 | 29.3 | 51.1 | (¹) |
| 10 | Benzene disulfonic acid | 0.5 | 18.4 | 32.0 | 53.2 | (¹) |
| 11 | Ethylacid sulfate | 1 | 21.8 | 22.3 | 39.2 | (¹) |

¹ Test discontinued after 250 hours.

The data in the foregoing table illustrates the superior polymeric weight loss properties obtained when certain additives are incorporated into the varnish prior to impregnating the glass cloth. In each instance a beneficial and unexpected decrease in weight loss is obtained. Examples 9 and 10 illustrate that this unexpected thermal stability is obtained when as little as 0.5% by weight of additive is incorporated into the varnish. Examples 2 and 11 using only 1% by weight of additive also show good thermal stability. Note Example 4 where the weight loss after 315 hours is only 18.5% as compared with a loss of 78.5% for the control which contained no additive.

The foregoing results in Table I are even more surprising when one considers that the prolonged exposure at 700° F. was carried out in air and not in an inert atmosphere.

In the following Examples 12–13 the general procedure set forth above is followed except that asbestos is used as the fibrous reinforcing medium in place of the glass cloth used in Examples 1 to 11.

EXAMPLE 12 (CONTROL)

The varnish prepared in Example 1 is used to impregnate an asbestos mat which is treated and cured in the same manner as the glass cloth used in Examples 1 to 11. The asbestos coupon is aged for varying times at 700° F. and the resin weight loss is determined. The results of this aging test is tabulated below in Table II.

The general procedure of Example 12 is followed here except that 5% by weight of butyl acid phosphate, based on the solids content of the varnish, is added to the varnish prepared in Example 1 prior to impregnating asbestos mat.

TABLE II.—WEIGHT LOSS STUDY—USING ASBESTOS CLOTH COUPONS

| Example | Stabilizer | Amount percent | Time (hrs.) at 700° F. in air | | | |
|---|---|---|---|---|---|---|
| | | | 110 | 158 | 250 | 315 |
| 12 (Control) | None | | 38.3 | 67.2 | 89.3 | 96.8 |
| 13 | Butyl acid phosphate | 5 | 10.9 | 16.1 | 23.0 | 27.7 |

The data in Table II clearly illustrates the significant thermal stability which is imparted to the polymeric product on the asbestos coupons. Note that after 315 hours at 700° F. in air, the weight loss in the samples containing butyl acid phosphate is only about 29% of the weight loss that occurred in the control sample. This indicates the surprisingly superior thermal stability which is obtained in polymeric compositions in the practice of this invention.

The following examples are set forth to further illustrate the superior resin thermal stability that is obtained in the practice of this invention and to illustrate some of the variations that can be made in the polymer forming reactants. In each case the varnish is prepared, formulated, coated onto 181E-A1100 glass cloth and cured according to the procedures outlined above. The coupons are then aged at 700° F. and the time required for 50% resin weight loss at 700° F. is measured. In each example the coupon is tested using a polymeric composition that contains no additive (Control) and the same polymeric composition containing 7.5% by weight of ethyl acid phosphate based on the weight of the solids content in the monomeric varnish. The compositions of the monomeric varnishes and the time required for 50% resin weight loss is tabulated in Table III.

useful life of the polymeric compositions during prolonged exposure at high temperature, 700° F. in the present examples, is extended at least 2.3 times.

EXAMPLES 18 TO 31

The following examples are set forth to illustrate the various tetracarboxylic components and polyamine components that may be used in the practice of this invention in order to form polymeric compositions with improved thermal stability. In each example the monomeric varnish is prepared according to the general procedure of Example 1, and 5% by weight of butyl acid phosphate, based on the weight of solids in the monomeric varnish, is added to the varnish solution using mild agitation. Glass cloth coupons are then prepared and tested at 700° F. for resin weight loss according to the procedures set forth above. The various monomeric reactants used in each example are set forth below in Table IV.

TABLE IV.—SUMMARY OF REACTANTS USED IN EXAMPLES 18 TO 29

| Example | Solvent | Tetracarboxylic component | Polyamine component | Mole ratio of component tetracarboxylic/polyamine |
|---|---|---|---|---|
| 18 | NMP/ETOH | BTDA-dipyridine salt | m-Phenylene diamine | 1/1 |
| 19 | NMP/ETOH | BTDA-diethyl ester | Hexamethylene diamine | 1.1/1 |
| 20 | NMP/ETOH | BTDA-diethyl ester | Nonamethylene diamine | 1/1 |
| 21 | NMP/BuOH | BTDA-dibutyl ester | 4,4'-diaminodiphenyl ether. | 1/1 |
| 22 | Ethylene glycol | BTDA-diethylene glycol ester. | Methylene diamine | 1/1 |
| 23 | BuOH | BTDA-dibutyl ester | m-Phenylene diamine: melamine. | 1/1/2:1/2 |
| 24 | NMP+ETOH | PMDA-diethyl ester | Hexamethylene diamine | 1/1 |
| 25 | NMP | Benzophenone tetracarboxylic acid. | m-Phenylene diamine | 1/1 |
| 26 | NMP/ETOH | BTDA-diethyl ester-diammonium salt. | do | 1/1 |
| 27 | NMP/ETOH | BTDA-diethyl ester | 2,6-diamine pyridine | 1/1 |
| 28 | NMP/ETOH | {BTDA-diethyl ester / PMDA-diethyl ester} | {m-Phenylene diamine / Methylene dianiline} | 1/2:1/2/1/2:1/2 |
| 29 | ETOH | BTDA-tetraethyl | 4,4'-oxydianiline | 1/1.4 |

NOTE.—Legend: NMP/ETOH = N-methyl pyrrolidone/ethanol 4/1 by volume; BuOH = Butanol; BTDA = Benzophenone tetracarboxylic acid dianhydride; PMDA = Pyromellitic dianhydride.

In each example a significant increase in the resin thermal stability of the glass coupon was observed when using 5% by weight of butyl acid phosphate. This was observed as a marked decrease in resin weight loss as compared with a control sample for each system, which contained no thermal stabilizer, and which suffered significantly

TABLE III.—TIME REQUIRED FOR 50% RESIN WEIGHT LOSS AT 700°F.

| | Varnish | | | Time to 50% resin wt. loss (hrs.) in air | |
|---|---|---|---|---|---|
| Example | Tetracarboxylic component | Polyamine component | Solvent | Control | Additive (7.5% ethyl acid phosphate) |
| 14 | Benzophenonetetracarboxylic acid diethyl ester. | m-Phenylene diamine. | N-methyl pyrrolidone. | 200 | 625 |
| 15 | Benzophenonetetracarboxylic acid diethyl ester. | Methylene dianiline. | do | 55 | 140 |
| 16 | Benzophenonetetracarboxylic acid dibutyl ester. | m-Phenylene diamine. | Butanol | 130 | 480 |
| 17 | Benzophenonetetracarboxylic acid di(ethylene glycol) ester. | do | Ethylene glycol. | 130 | 300 |

The significant increase in the time required to achieve a 50% resin weight loss when certain additives are added to the monomeric varnishes in the practice of this invention is further demonstrated in the above Table III. Note that in each example that, when an additive is used in accordance with the teachings of the present invention, the exposure time required for 50% resin weight loss is at least 2.3 times longer than the times for the control samples where no additives are used. In other words, the more resin weight loss after prolonged exposure at at 700° F. Example 28 shows the use of a mixture of tetracarboxylic components and a mixture of diamine components in the varnish. Examples 19 and 20 which use aliphatic diamines as the polyamine component are added to the monomeric varnishes in accordance with the practice of this invention. However, as stated above, these aliphatic components do not have the thermal stability exhibited by their preferred aromatic counterparts.

EXAMPLE 30

This example is set forth to illustrate that improved thermal stability is obtained in the cured polymeric system when the monomeric varnish is coated onto a metal sheet and polymerized in situ to form a surface coating. The varnish prepared in Example 1 is used along with 1% by weight of butyl acid phosphate based on the weight of the monomeric components in the varnish. A sample of the varnish without the thermal stabilizer additive was used as a control. The samples were then aged at 700° F. and tested for resin weight loss. The resin weight loss after 138 and 310 hours for the polymeric material with the thermal stabilizer was 13.5% and 46% respectively, versus 24% and 63% for the control sample. This example illustrates that improved thermal stability can be obtained in the practice of this invention when the polymeric composition is used as a surface coating as well as an impregnating resin.

The following Examples 31 to 36 are set forth to illustrate the improved flexural strength that is achieved in 12 ply glass laminates after prolonged aging when the impregnating resin contains a thermal stabilizer additive in accordance with the practice of the present invention.

EXAMPLE 31 (CONTROL)

Style 181E–A1100 glass cloth is dipped in the monomeric varnish of Example 1 so as to give a 20 mil wet build and then B-staged. The details of the process are as follows: The bare cloth is dipped in the varnish, allowed to drain in air for 15 minutes and dried for one hour at 120° C.

Twelve pieces of cloth thus treated are placed on top of one another and this lay-up is laminated using conventional vacuum bag techniques and an electrically heated hydraulic press. Full vacuum (0.5 mm. of mercury), using a Welch vacuum pump with a Dry Ice trap, is applied to the lay-up at room temperature. After placing the lay-up in a cold press, the temperature of the platens is raised at about 8° F./min. to 350° F. maintaining light contact pressure. When the platen temperature reaches 250° F. high boiling condensate begins collecting in the trap. By 350° F. almost all of the high boiling condensate is collected. After reaching 350° F., light contact pressure is maintained for an optimum initial contact time, determined as described below. Then 100 p.s.i. augmented pressure is applied and maintained at full vacuum and 350° F. for 1 hour. The laminate is water cooled at 100 p.s.i. plus full vacuum.

The laminates are post cured to 700° F. in 12 hours starting at 350° F. Approximately four hours additional curing at 700° F. are given in order to achieve optimum initial hot strength. One-half (½) inch strips of the laminates are then aged at 700° F. for 175 hours, after which time the laminate is tested for flexural strength according to ASTM method D–790. Testing is carried out at 700° F. on an Instron tester using a cross head speed of 0.5 inch/min. and an F-cell. The results of this test are tabulated below in Table V.

EXAMPLES 32 to 36

In the following examples the procedure of Example 31 is followed except that varying amounts of a thermal stabilizer additive is added to the monomeric varnish solution prior to impregnating the glass cloth in preparation of the laminate. The results of the flexural strength tests on these laminates are tabulated in the following Table V.

TABLE V.—FLEXURAL STRENGTHS OF LAMINATES AFTER AGING FOR 175 HRS. AT 700° F.

| Example | Additive | Percent additive | Flexural strength (p.s.i.) in air |
|---|---|---|---|
| 32 (Control) | None | | 5,000 |
| 33 | Butyl acid phosphate | 2.5 | 15,000 |
| 34 | do | 5 | 23,000 |
| 35 | Ethyl acid phosphate | 1 | 11,000 |
| 36 | do | 7 | 14,000 |

The improved flexural strength, that is obtained in glass laminates when the impregnating varnish contains a thermal stabilizer additive in accordance with the practice of the present invention, is apparent when one considers the data in the foregoing Table V. This data illustrates the prolonged useful life of glass laminates that is made possible using the practice of the present invention.

Note that as little as 1% ethyl acid phosphate provides a laminate with over twice the flexural strength as is obtained in the control sample.

In the foregoing examples glass cloth and asbestos cloth was used as the fibrous reinforcing medium. However, as will be apparent to those skilled in the art, other fibrous and particulate reinforcing media may be used such as boron, quartz, refrasil and silica fibers or metallic particulate fillers such as aluminum microballons, titanium dioxide, etc.

EXAMPLE 37

This example is set forth to illustrate that foamed polymeric compositions which are prepared from tetracarboxylic components and a polyamine have improved thermal stability and prolonged life during exposure at high temperature when prepared in accordance with the practice of the present invention. In this example a 60% solids solution is prepared by dissolving in ethanol equimolar amounts of the diethylester of benzophenonetetracarboxylic acid (414 parts by weight) and meta-phenylene diamine (108 parts by weight). This solution is divided into two aliquots and one aliquot is maintained as a control. Thirteen (13) parts by weight of butyl acid phosphate is added to the second aliquot using mild agitation to provide a system containing 5% by weight of butyl acid phosphate based on the total weight of the diamine and tetracarboxylic acid ester. The respective solutions are evaporated down to give a system having 24% volatiles as measured by conventional volatile measurements. These 24% volatile systems are then placed in an oven at 300° C. for two hours after which time the respective foams are post cured for 4 hours at 700° F. Weight loss studies are then carried at 700° F. for various times according to the procedures set forth above. The control sample which contained no butyl acid phosphate showed substantially greater weight loss upon prolonged exposure to 700° F. than did the sample containing butyl acid phosphate.

EXAMPLE 38

This example is set forth to illustrate that molded objects which are prepared from tetracarboxylic components and a polyamine have improved thermal stability and prolonged life during exposure at high temperatures when prepared in accordance with the practice of the present invention. Two equimolar 2B ethanol solutions of the diethyl ester of benzophenone tetracarboxylic acid and m-phenylene diamine are evaporated to dryness using a Rinco evaporator at 50° C. and partial vacuum. The control solution contains no additive whereas the other contains 5% by weight of butyl acid phosphate based on the weight of tetracarboxylic and diamine component. This intimate mixture of dry solid reactants is then pre-heated at 110° C. for 5 hours, at 135° C. for 5 hours, ground to a fine powder, and then pressed in a mold for one hour at 13,000 p.s.i. and 600° F. to give a disc having a diameter of 2¼ inches and a height of ¼ inch. This disc is then post cured at 300° C. for 9 hours. Weight loss studies are then carried at 700° F. for various times according to the procedures set forth above. The control sample which contained no butyl acid phosphate showed substantially greater weight loss upon prolonged exposure to 700° F. than did the sample containing butyl acid phosphate.

EXAMPLE 39

The following examples 39 to 40 are set forth to show the use of an impregnating varnish prepared from a tricarboxylic acid component and a diamine. These examples illustrate the improved thermal stability which is obtained in these varnishes when a stabilizing component is added to the varnish according to the practice of the present invention.

Trimellitic anhydride (96.0 g., 0.5 mol) is placed in a jar and slurried with N-methylpyrrolidone (268 g.). Ethanol (24 g., anhydrous 2B) is added and the slurry is warmed with stirring until all the trimellitic anhydride (TMA) is dissolved. The solution is maintained at 50 to 60° C. for 30 minutes to ensure complete reaction of the anhydride. Xylene (134 g.) and methylene dianiline (148.5 g.) are then added and the solution is warmed to 65° C. until all the solids dissolve. The resulting stable solution containing 40% by weight of dissolved solids is then used to prepare Style 181E–A1100 glass coupons. One set of coupons is prepared using the straight varnish whereas another set of coupons is prepared using varnish which has been formulated with 5% by weight of butyl acid phosphate based on the weight of the solids in the varnish. These coupons are cured and tested for resin weight loss according to the procedures outlined above. The average resin weight loss for the respective sets of coupons after 161 hours at 700° F. in air are as follows:

Percent resin weight loss
Control varnish (no additive) _____ 80
Varnish with 5% butyl acid phosphate _____ 55

EXAMPLE 40

Example 39 is repeated here except using benzophenone-4,3',4'-tricarboxylic anhydride in place of the trimellitic anhydride used in Example 39. Comparable resin weight loss results are obtained.

In the following examples 41 to 46, Example 39 is repeated except that butyl acid phosphate is replaced by various other thermal stabilizer additives. The coupons are prepared and tested according to the procedures described above. In each example an improvement in thermal stability over the control is noted. The various additives used are tabulated in the following Table VI.

TABLE VI.—SUMMARY OF ADDITIVES USED IN EXAMPLES 41 TO 46

| Example: | Additives used | Amount[1] |
|---|---|---|
| 41 | Ethyl acid borate | 7.5 |
| 42 | n-Butyl hydrogen sulfate | 5.0 |
| 43 | Phosphoric acid (85%) | 1.0 |
| 44 | Boric acid | 10.0 |
| 45 | Boronic acid | 5.0 |
| 46 | Butyl acid borate | 5.0 |

[1] Weight percent based on total weight of monomeric components.

The lower alkyl borates such as trimethyl borate tend to be volatile during temperatures of cure. The volatility of the borates can be reduced by methods known to those skilled in the art such as by the presence of water in the system. When using these compounds, precautions should be taken so as to insure that they do not volatilize during cure.

The present invention is applicable to the polymeric product of the tetracarboxylic component and polyamine component described above regardless of the form or end use application for the polymeric composition. Thus, the polymeric composition may be in the form of an electrical component insulation, thermal insulation, surface coating, impregnating resin, structural adhesive, free films, spheres or microballoons, foam molding powder or other related materials.

This present invention also contemplates the use of other additives or adjuncts commonly used in polymeric composition prepared from tetracarboxylic and polyamine components such as catalysts, fillers, extenders, adhesion promotors, blowing agents, foaming agents, etc.

In view of the foregoing it is obvious that many deviations may be made in the products or processes set forth above without departing from the scope of this invention.

What is claimed is:
1. A polymer forming composition which comprises in admixture
   (A) an aromatic polycarboxylic component containing from three to four carboxylic groups per molecule selected from the group consisting of free polycarboxylic acids, esters of the polycarboxylic acids and ammonium salts of polycarboxylic acids;
   (B) a polyamine component containing at least two primary amino groups per molecule; and
   (C) a thermal stabilizer selected from the group consisting of
      (1) inorganic oxyacids of boron, phosphorous and sulfur,
      (2) alkyl acid phosphates,
      (3) alkyl acid esters of an oxyacid of boron or sulphur,
      (4) ammonium and substituted ammonium phosphates,
      (5) ammonium and substituted ammonium salts of any oxyacid or boron or sulphur,
   wherein the alkyl groups contain from 1 to 12 carbon atoms, wherein the amount of stabilizer in the polymer forming composition is at least 0.1% by weight based on the total weight of the polycarboxylic and polyamine components, and wherein the polycarboxylic and polyamine components are present in amounts ranging from about 70% molar excess of the polyamine to about a 10% molar excess of the polycarboxylic component.

2. The polymer forming composition of claim 1 wherein the thermal stabilizer is selected from the group consisting of boric acid, phosphoric acid and sulfuric acid.

3. The polymer forming composition of claim 1 wherein the thermal stabilizer is selected from the group consisting of ammonium salts and substituted ammonium salts of an acid selected from the group consisting of boric acid, phosphoric acid and sulfuric acid.

4. The polymer forming composition of claim 1 wherein the thermal stabilizer is an ester selected from the group consisting of alkyl acid borates, alkyl acid phosphates and alkyl acid sulfates.

5. A polymer forming composition which comprises in admixture
   (A) an alkyl diester of benzophenone tetracarboxylic acid,
   (B) an aromatic diprimary amine and
   (C) from 0.5% to 20% by weight, based on the total weight of the alkyl diester of benzophenone tetracarboxylic acid and aromatic primary diamine, of a thermal stabilizer selected from the group consisting of alkyl borates, alkyl phosphates and alkyl sulfates containing at least one alkyl group per molecule wherein the alkyl group contains from 1 to 12 carbon atoms, and wherein the benzophenone tetracarboxylic acid ester and diprimary amine components are present in amounts ranging from about a 70% molar excess of the diamine to about a 10% molar excess of the tetracarboxylic acid ester.

6. The polymer forming composition of claim 5 wherein the diester is benzophenonetetracarboxylic acid diethyl ester.

7. The polymer forming composition of claim 5 wherein the diester is benzophenonetetracarboxylic acid di-(ethylene glycol)ester.

8. The polymer forming composition of claim 5 wherein the aromatic diprimary amine is selected from the group consisting of m-phenylene diamine; p-phenylene diamine; 4,4'-oxydianiline and 4,4'-methylene dianiline; and wherein the thermal stabilizer is an alkyl acid phosphate.

9. A polymer forming composition which comprises in admixture
(A) an alkyl ester of a tricarboxylic acid selected from the group consisting of trimellitic acid and benzophenone tricarboxylic acid;
(B) an aromatic diprimary amine and
(C) from 0.5% to 20% by weight, based on the total weight of the alkyl ester of the tricarboxylic acid and aromatic primary diamine, of a thermal stabilizer selected from the group consisting of alkyl borates, alkyl phosphates and alkyl sulfates; wherein the alkyl ester of the tricarboxylic acid and diprimary amine components are present in amounts ranging from about a 70% molar excess of the diamine to about a 10% molar excess of the alkyl ester of the tricarboxylic acid.

10. A polymeric composition with improved thermal properties comprising the polymeric reaction product of
(A) an aromatic polycarboxylic component containing from three to four carboxylic acid groups per molecule selected from the group consisting of free polycarboxylic acids, esters of polycarboxylic acids and ammonium salts of polycarboxylic acids;
(B) a polyamine component containing at least two primary amino groups per molecule; and
(C) a thermal stabilizer selected from the group consisting of
(1) inorganic oxyacids of boron, phosphorous and sulphur,
(2) alkyl acid phosphates,
(3) alkyl acid esters of an oxyacid of boron or sulphur,
(4) ammonium and substituted ammonium phosphates,
(5) ammonium and substituted ammonium salts of an oxyacid of boron or sulphur,
wherein the amount of stabilizer in the polymeric composition is in the range of from 0.1% to 20% by weight based on the total weight of the polycarboxylic and polyamine components.

11. The polymeric composition of claim 10 wherein the thermal stabilizer is an alkyl acid phosphate.

12. The polymeric composition of claim 10 wherein the thermal stabilizer is selected from the group consisting of ammonium salts and substituted ammonium salts of an acid selected from the group consisting of boric acid, phosphoric acid and sulfuric acid.

13. The polymeric composition of claim 10 wherein the thermal stabilizer is an ester selected from the group consisting of alkyl acid borates, alkyl acid phosphates and alkyl acid sulfates.

14. A foamed polymeric composition with improved thermal properties comprising the foamed polymeric reaction product of
(A) an aromatic polycarboxylic component containing from three to four carboxylic groups per molecule selected from the group consisting of free polycarboxylic acids, esters of the polycarboxylic acids and ammonium salts of the polycarboxylic acids;
(B) a polyamine component containing at least two primary amino groups per molecule; and
(C) a thermal stabilizer selected from the group consisting of
(1) inorganic oxyacids of boron, phosphorous and sulphur,
(2) alkyl acid phosphates,
(3) alkyl acid esters of an oxyacid of boron or sulphur,
(4) ammonium and substituted ammonium phosphates,
(5) ammonium and substituted ammonium salts of an oxyacid of boron or sulphur,
wherein the amount of stabilizer in the polymer forming composition is in the range of from 0.1% to 20% by weight based on the total weight of the polycarboxylic and polyamine components.

15. The foamed polymeric composition of claim 14 wherein the polycarboxylic component is a diester of benzophenone tetracarboxylic acid.

16. A molded object with improved thermal properties which is the polymeric reaction product of a polymer forming composition comprising:
(A) an aromatic polycarboxylic component having three to four carboxylic groups per molecule selected from the group consisting of free polycarboxylic acids, ester of polycarboxylic acids and ammonium salts of polycarboxylic acids;
(B) a polyamine component containing at least two primary amino groups per molecule; and
(C) a thermal stabilizer selected from the group consisting of
(1) inorganic oxyacids of boron, phosphorous and sulphur,
(2) alkyl acid phosphates,
(3) alkyl acid esters of an oxyacid of boron or sulphur,
(4) ammonium and substituted ammonium phosphates,
(5) ammonium and substituted ammonium salts of an oxyacid of boron or sulphur,
wherein the amount of stabilizer in the polymer forming composition is in the range of from 0.1% to 20% by weight based on the total weight of the polycarboxylic and polyamine components.

17. The polymer forming composition of claim 16 wherein the polycarboxylic component is a diester of benzophenone tetracarboxylic acid.

18. The polymer forming composition of claim 17 wherein the aromatic diprimary amine is selected from the group consisting of m-phenylene diamine; p-phenylene diamine; 4,4'-oxydianiline and 4,4'-methylene dianiline; and wherein the thermal stabilizer is an alkyl acid phosphate wherein the alkyl group contains from 1 to 12 carbon atoms.

References Cited

UNITED STATES PATENTS

| 2,944,993 | 7/1960 | Brebner et al. | 260—37 |
| 3,179,634 | 4/1965 | Edwards | 260—78 |
| 3,242,128 | 3/1966 | Chalmers | 260—32.6 |
| 3,242,136 | 3/1966 | Endrey | 260—47 |
| 3,389,111 | 6/1968 | McKeown | 260—30.2 |
| 3,391,120 | 7/1968 | Fritz | 260—63 |
| 3,416,994 | 12/1968 | Chalmers et al. | 161—227 |
| 3,440,202 | 4/1969 | Boldebuck et al. | 260—31.2 |
| 3,483,144 | 12/1969 | Lavin et al. | 260—2.5 |

DONALD E. CZAJA, Primary Examiner

R. A. WHITE, Assistant Examiner

U.S. Cl. X.R.

117—126, 132; 161—192; 260—45.7, 45.9, 78